(No Model.)  4 Sheets—Sheet 1.
H. H. GRENFELL.
SIGHTING APPARATUS FOR GUNS.

No. 565,742. Patented Aug. 11, 1896.

(No Model.) 4 Sheets—Sheet 2.
H. H. GRENFELL.
SIGHTING APPARATUS FOR GUNS.
No. 565,742. Patented Aug. 11, 1896.
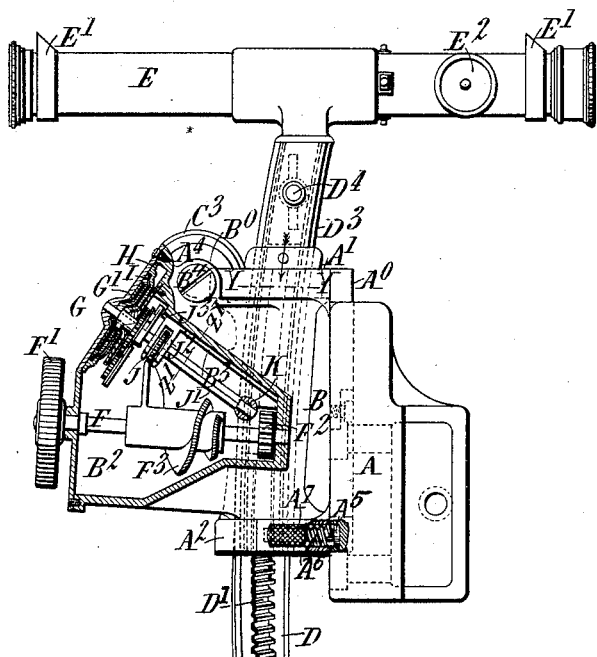
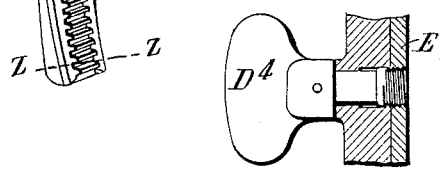
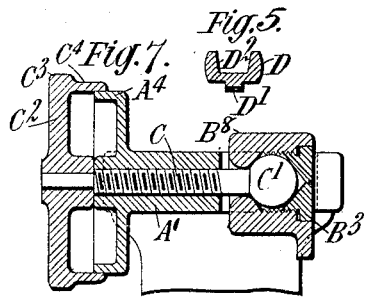
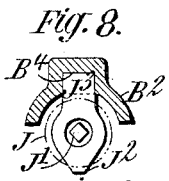

(No Model.) 4 Sheets—Sheet 3.
H. H. GRENFELL.
SIGHTING APPARATUS FOR GUNS.
No. 565,742. Patented Aug. 11, 1896.
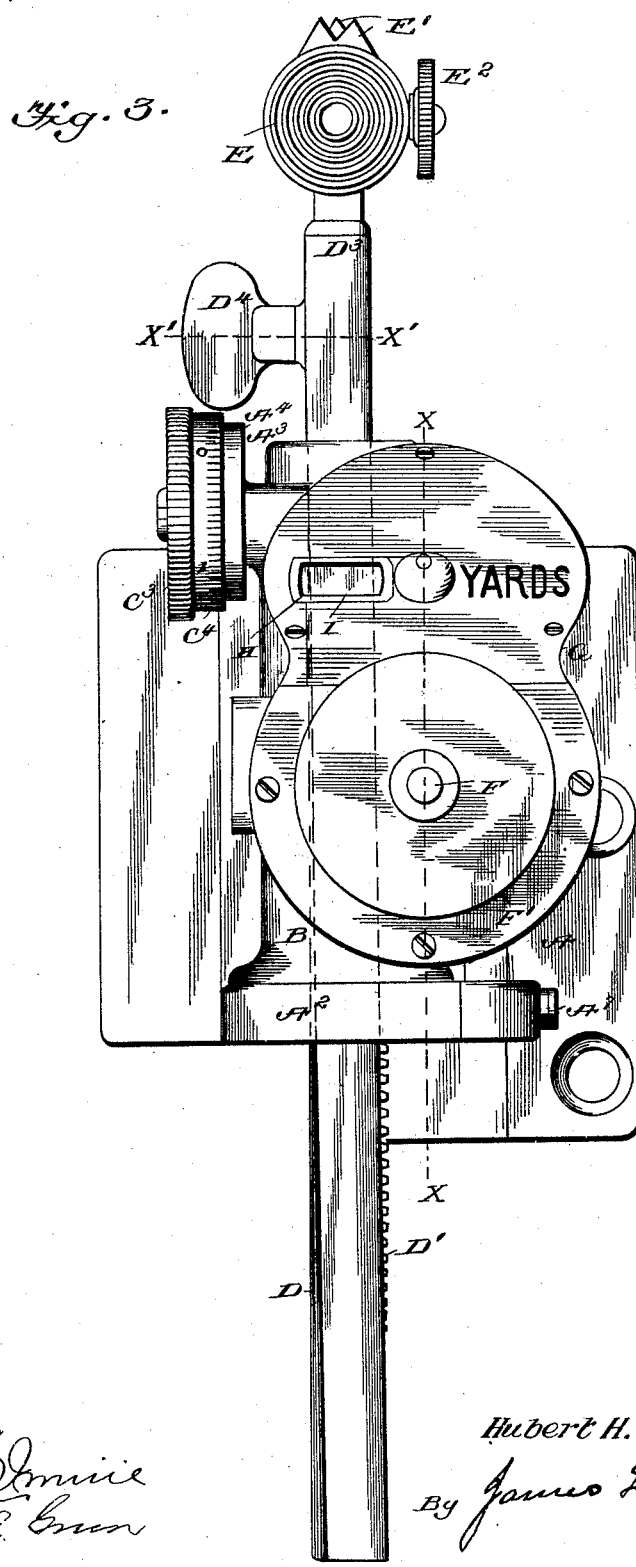
Witnesses
John Imrie
Thos. A. Crun
Inventor
Hubert H. Grenfell
By James L. Norris
Attorney (No Model.)  4 Sheets—Sheet 4.

H. H. GRENFELL.
SIGHTING APPARATUS FOR GUNS.

No. 565,742.  Patented Aug. 11, 1896.

Witnesses,
G. W. Rea
Robert Everett

Inventor:
Hubert H. Grenfell,
By James L. Norris.
Atty.

UNITED STATES PATENT OFFICE.

HUBERT HENRY GRENFELL, OF LONDON, ENGLAND.

SIGHTING APPARATUS FOR GUNS.

SPECIFICATION forming part of Letters Patent No. 565,742, dated August 11, 1896.

Application filed October 30, 1893. Serial No. 489,519. (No model.)

*To all whom it may concern:*

Be it known that I, HUBERT HENRY GRENFELL, captain Royal Navy, a subject of the Queen of Great Britain, and a resident of London, England, have invented certain new and useful Improvements in Sighting Apparatus for Guns, of which the following is a specification, reference being had to the accompanying drawings.

This invention relates to sighting apparatus characterized by the following features, viz: the combination with a curved and twisted sight-bar on which is fixed a telescope or equivalent device having fore and hind sights, of range-indicating apparatus in operative connection with the sight-bar, such connection having a variable velocity ratio; also, a sight-bar fitted with sighting devices, as aforesaid, and formed and arranged to give automatically the correction for drift at any elevation; also, the combination, with the said sighting device and the curved and twisted sight-bar, of means for effecting the rotary adjustment of the sighting device about a pivot to correct the aim by allowance for deflection by wind or other cause which produces lateral deviation additional to the amount of drift corrected automatically, as aforesaid.

In order that my said invention may be clearly understood, I will now proceed to describe the same with reference to the accompanying drawings, wherein—

Figure 1:
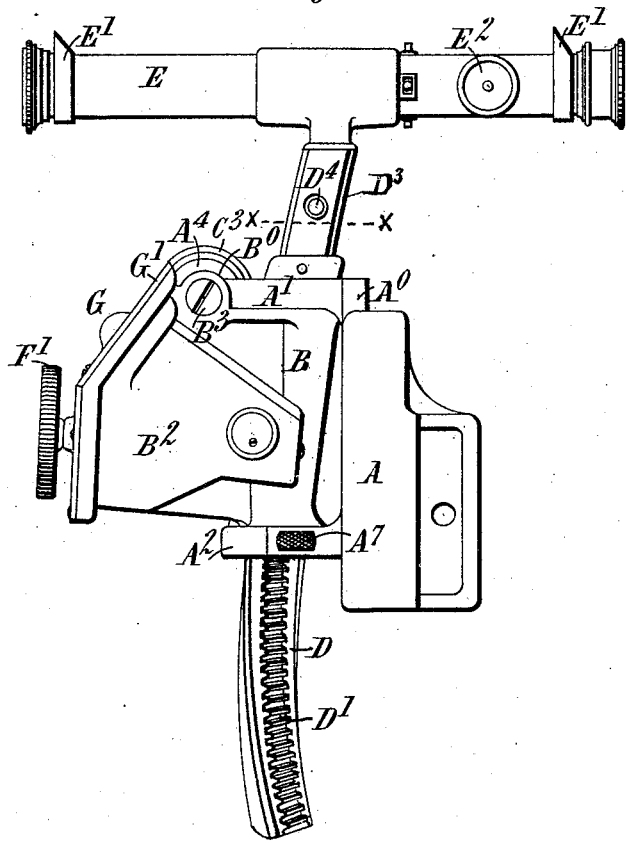
Figure 4:
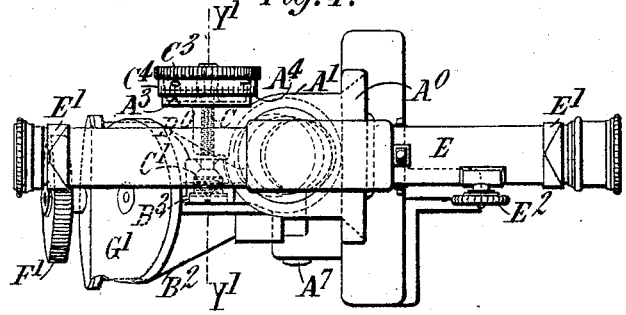
Figure 11:
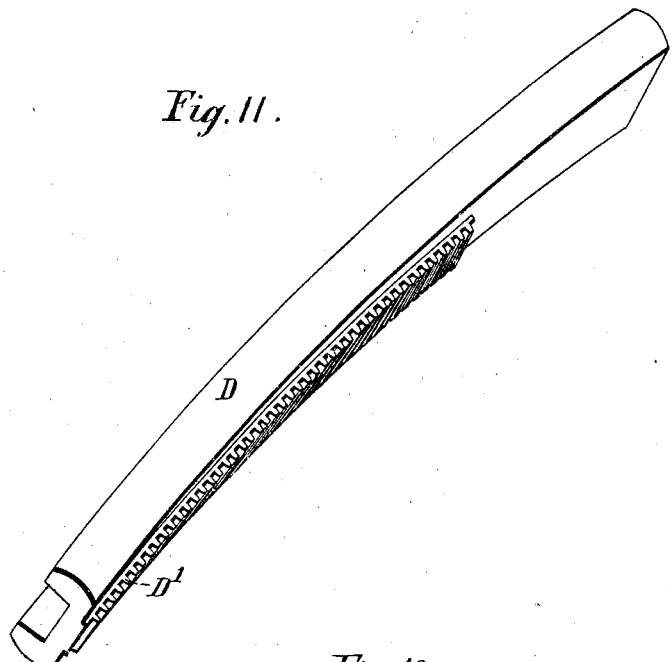
Figure 10:
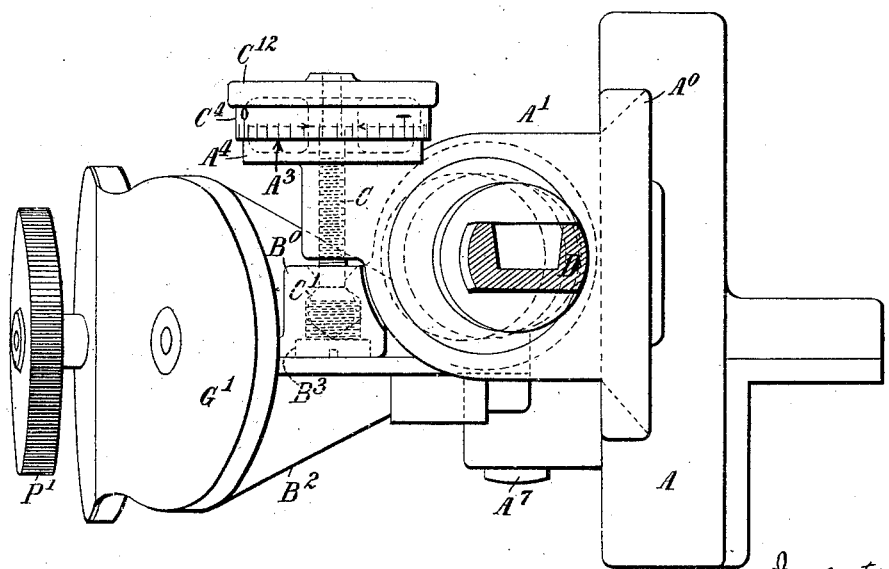

Figure 1 is a side elevation of an improved sighting apparatus constructed according to this invention. Fig. 2 is a view similar to Fig. 1, partly in section, on the line X X of Fig. 3. Fig. 3 is a rear elevation, and Fig. 4 is a plan, of the sighting apparatus shown in Fig. 1. Fig. 5 is a section of the sight-bar on the lines Y Y and Z Z, respectively, of Fig. 2. Figs. 6 and 7 are sections on the lines X' X' and Y' Y' of Figs. 3 and 4, respectively. Fig. 8 is a view of a part of Fig. 2 on the line Z' Z' of the last-named figure. Fig. 9 is an under side view of the device shown in Fig. 8. Fig. 10 is a sectional plan on line $x$ $x$, Fig. 1, showing the parts immediately below the plane of section. Fig. 11 is a perspective view of the curved and twisted portion of the sight-bar, with the twist intentionally exaggerated, and with the shape of the curved bar prior to the provision of the twist indicated by dotted lines.

Like reference-letters indicate corresponding parts throughout the drawings.

A is a bracket which can be attached to any suitable part of the gun. $A^0$ is a removable frame held in place in a suitable groove in the bracket A by means hereinafter described.

B is a sleeve having its upper and lower ends fitted to turn easily in bearings in the parts $A'$ $A^2$ of the frame $A^0$.

$B^0$ is a lug formed upon the sleeve B.

C is a screw-threaded spindle which turns in a tapped hole in the part $A'$ of the frame $A^0$ and is provided with a spherical end $C'$, which is received in a chamber formed in part by a cavity in the lug $B^0$ and in part by a conically-bored nut $B^3$, screwed into the said cavity. (See Fig. 7.)

$C^2$ is a disk fixed to the spindle C. The said disk is provided with a milled rim $C^3$, whereby it and the spindle C can be conveniently turned to turn the sleeve B. A portion $C^4$ of the periphery of the disk is suitably graduated to be employed with reference to the index or arrow-head $A^3$ on an adjoining circular portion $A^4$ of the frame $A^0$ as a guide to the adjustment of the sleeve B, for a purpose hereinafter specified.

$A^5$ is a bolt which slides in a recess in the frame $A^0$ and is kept in engagement with a notch in the bracket A by a spring $A^6$, so that the frame $A^0$ is thereby locked securely in its place in the bracket.

$A^7$ is a thumb-piece secured to the bolt $A^5$. It projects to the exterior of the frame $A^0$ and can be moved to draw the bolt $A^5$ back into the recess in the frame when it is desired to disengage the part $A'$ of the frame from the bracket.

D is a circularly-curved twisted sight-bar adapted to slide in the direction of its length through a similarly curved and twisted channel or guide in the sleeve B.

It is an important feature of my invention that the turning of the sleeve effects the turning of the sight-bar to adjust, laterally, the line of sight. Consequently there is no need for the employment, as heretofore, of adjusting devices for that purpose at the head of the bar.

$D'$ is a toothed rack formed upon one side of the sight-bar.

$D^2$ is a channel formed at the opposite side thereof to receive the ends of a spring $B'$, which is secured in the sleeve B and serves to keep the sight-bar steady therein.

E is a telescope held in a grooved part $D^3$ of the head of the sight-bar.

$E'$ $E'$ are auxiliary sights fixed upon the exterior of the telescope, as shown.

$E^2$ is a milled head upon the focusing-screw of the telescope.

$D^4$ is a screw by which the telescope is retained in place on the sight-bar. The said sight-bar is made of suitable length, in the form of an arc of a circle. The rack-teeth $D'$ gear with a pinion for effecting its vertical adjustment through the guide or socket. Details of the mechanism by which the said vertical adjustment is made will be hereinafter set forth. According to my present invention the said sight-bar is not only curved circularly, but is also slightly twisted, like a screw wherein the pitch is very considerable in proportion to the diameter. This twist effects the aforesaid automatic correction for drift in the manner hereinafter explained.

I combine the range-indicating device with the sight-bar by a peculiar arrangement of gearing, which will now be described, whereby, notwithstanding the varying lengths of movement of the bar to correspond with equal increments of range, the indicator-disks are operated in such a manner as to give correct indications of equal clearness for all ranges of the gun. This part of my invention is substantially similar to the invention set forth in the specification of British Letters Patent No. 934, of A. D. 1892, granted to me, but in the present instance the indicating apparatus is shown and described in its application to a curved sight-bar, whereas the said prior specification relates to its application to a straight sight-bar.

$B^2$ is a hollow extension formed upon the sleeve B.

F is a spindle arranged to turn in bearings in the said extension.

$F'$ is a milled wheel or disk secured to the outer end of the spindle F.

$F^2$ is an ordinary toothed pinion secured to the inner end of the spindle F and geared with the rack $D'$. The spindle F has also a spirally-formed taper-wheel or taper-rack $F^3$ fixed thereon, and is provided with a series of teeth on its peripheral surface, as shown.

G is the range-indicator. H and I are the rotary indicating-disks thereof, geared together by any suitable means. The disk H indicates "thousands" and the disk I "hundreds." For example, the said indications may signify distance either in yards or in other units, as desired.

$G'$ is the outer face or cover of the indicator. $G^2$ is an aperture in the face or cover through which the indications on the disks H and I can be seen. I may, however, substitute for this indicator any other suitable type of rotary indicator.

J is a pinion on the square spindle $J'$, which spindle has its inner end supported in a bearing K in the aforesaid extension $B^2$. The said pinion J can turn with but not upon the spindle $J'$. It gears with the spiral wheel $F^3$. The said spiral has a number of turns about its axis. These are of increasing diameter through the whole length of its periphery. It is therefore obvious that special provision must be made for keeping the said pinion J in gear with the wheel $F^3$. With this object I arrange the said pinion within a yoke $J^2$, (see Figs. 9 and 10,) which is fitted to slide upon the spindle $J'$ and has cheeks which embrace the edge of the spiral wheel. A part $J^3$ of the yoke is arranged to enter the guide-groove $B^4$ in the extension $B^2$, so that as the spiral wheel $F^3$ presents different parts of its periphery to the pinion J the latter is caused by the yoke to slide along the square spindle and to maintain proper connection with the said spiral wheel.

The operation of the said improved sighting and indicating device will now be described.

By rotating the milled disk $F'$ the spindle F is operated and the pinion $F^2$ caused to act upon the rack $D'$ to slide the curved sight-bar up or down through the sleeve B. The sight-bar in its movement through the sleeve not only adjusts the telescope vertically for any range, but also, by a turning movement due to the twist of the bar and the twist of the guide-channel in the sleeve through which it moves, turns the telescope automatically to make the necessary correction for drift. Further adjustment of the telescope, to allow for other correction of aim than that effected automatically, as aforesaid, is obtainable by turning the sleeve B in its bearings in the frame $A^0$ by means of the screw-gear operated by the disk $C^2$, whereby the sight-bar and telescope are turned with the sleeve, so that the said telescope can be very conveniently adjusted to rectify any error due to the force of wind moving in a lateral direction.

The mechanism whereby the raising and lowering of the sight-bar is effected is so arranged that while the velocity ratio of the sight-bar D with respect to the spindle F is constant, that of the indicator-spindle $J'$ with respect to the spindle F is variable, and, if the proper relative proportions of the parts have been secured in the construction and arrangement of the same, the varied movements of the bar D, which corresponds with the different angles of elevation of the gun for similar increments of the range, will coincide with the constant movements of the indicator-spindle $J'$, and therefore the range in every position of the gun will be correctly and clearly shown by the indicator. I thus obtain clear and distinct indications of all ranges or distances for which the sight-bar is used. This is obviously an important advantage, readily obtainable according to my invention. I do not limit this part of my invention to the aforesaid exemplification of the manner in which it may be put into practice, seeing that there are many other equivalent arrangements of mechanism whereby a like result can be secured.

What I claim is—

1. In a sighting device for ordnance, the combination with a support or frame, of a sleeve carried by said frame, a curved and twisted sight-bar movable within said sleeve, and means for moving said sight-bar so that the sighting device will be adjusted both vertically and laterally, as and for the purpose set forth.

2. In a sighting device for ordnance, the combination with a support or frame, of a curved and twisted sleeve journaled upon said frame, a similarly curved and twisted sight-bar fitted to travel within said sleeve, and means for moving said sight-bar so that the sighting device will be adjusted vertically and laterally simultaneously, substantially as described.

3. In a sighting device for ordnance, the combination with a support or frame, of a curved and twisted sleeve journaled upon said frame, a similarly curved and twisted sight-bar fitted to travel within said sleeve, a rack upon one side of said bar, a spring acting upon the opposite side of said bar, and a shaft-and-pinion connection with said racked sight-bar whereby the latter may be adjusted as desired, substantially as described.

4. In a sighting device for ordnance, the combination with a support or frame, of a sleeve journaled upon said frame a curved and twisted sight-bar traveling within said sleeve, a sliding bolt acting to retain the sight-bar in a fixed position and means for moving the sight-bar whereby the sighting device is adjusted both vertically and laterally, substantially as described.

5. In a sighting and indicating device for ordnance the combination with a support or frame, of a sleeve journaled upon said frame and provided with a curved and twisted sight-bar arranged to slide within said sleeve so that the sighting device will be adjusted both vertically and laterally by the single movement of said bar, a spindle supported in bearings on the sleeve and placed in direct operative connection with the sight-bar, a rotary indicating device, and gearing intermediate the latter and the spindle so that the indicating device is moved simultaneously with the vertical and lateral movement of the sight-bar, substantially as described.

6. In a sighting and indicating apparatus for ordnance, the combination with a support or frame, of a sleeve pivoted thereon and formed with a curved and twisted bore to receive a sight-bar, a curved and twisted sight-bar to slide in said sleeve, whereby said sight-bar is simultaneously moved in a vertical and lateral direction, a spindle supported in bearings on the sleeve and placed in direct operative connection with the sight-bar, a spiral wing secured on said spindle and provided on its periphery with serrations, and a rotary indicating device having a circular serrated member in operative connection with the serrations on the spiral wing and adapted to be rotated by said spiral wing through equal angles when the spindle is turned through varying angles, substantially as described.

In witness whereof I have hereunto set my hand this 10th day of October, 1893.

HUBERT HENRY GRENFELL.

Witnesses:
 GEO. HARRISON,
 THOMAS LAKE.